United States Patent [19]

Botsis et al.

[11] 4,008,744
[45] Feb. 22, 1977

[54] TIRE FAILURE INDICATOR

[75] Inventors: Nicolaos George Botsis; Panayotis Nicolas Korobilis, both of Athens; Ioannis Constantin Miras, Attica; George Michael Eriparelis, Athens, all of Greece

[73] Assignee: Lamir Ltd., Greece

[22] Filed: Mar. 14, 1975

[21] Appl. No.: 558,562

[30] Foreign Application Priority Data

Mar. 14, 1974 Greece ............................... 50156
June 7, 1974 Greece ............................... 50384
Aug. 22, 1974 Greece ............................... 51062
Oct. 5, 1974 Greece ............................... 50950

[52] U.S. Cl. ............................................. 152/427
[51] Int. Cl.² ................... B60C 29/00; B60C 23/02
[58] Field of Search .................. 152/427; 116/34 R; 137/226, 227, 230, 557

[56] References Cited

UNITED STATES PATENTS 1,325,918 12/1919 Valiton ............................ 116/34 R
3,792,677 2/1974 Frost ................................ 116/34 R
3,827,393 8/1974 Winther .......................... 116/34 R
3,911,988 10/1975 Richards ............................ 152/427
3,934,223 1/1976 Barabino ........................ 116/34 R Primary Examiner—Drayton E. Hoffman
Attorney, Agent, or Firm—Fred Wiviott

[57] ABSTRACT

A tire failure indicator includes a housing mounted in an air tight relation about the tire valve and between the tire valve and the rim valve opening. The housing is threadably mounted in a sealed relation at its outer end to the threaded valve end to provide a sealed enclosure. An indicator sleeve extends from the chamber and contains a pressure responsive indicator which moves into an indicating position when air pressure within the chamber increases as a result of tire failure.

10 Claims, 10 Drawing Figures

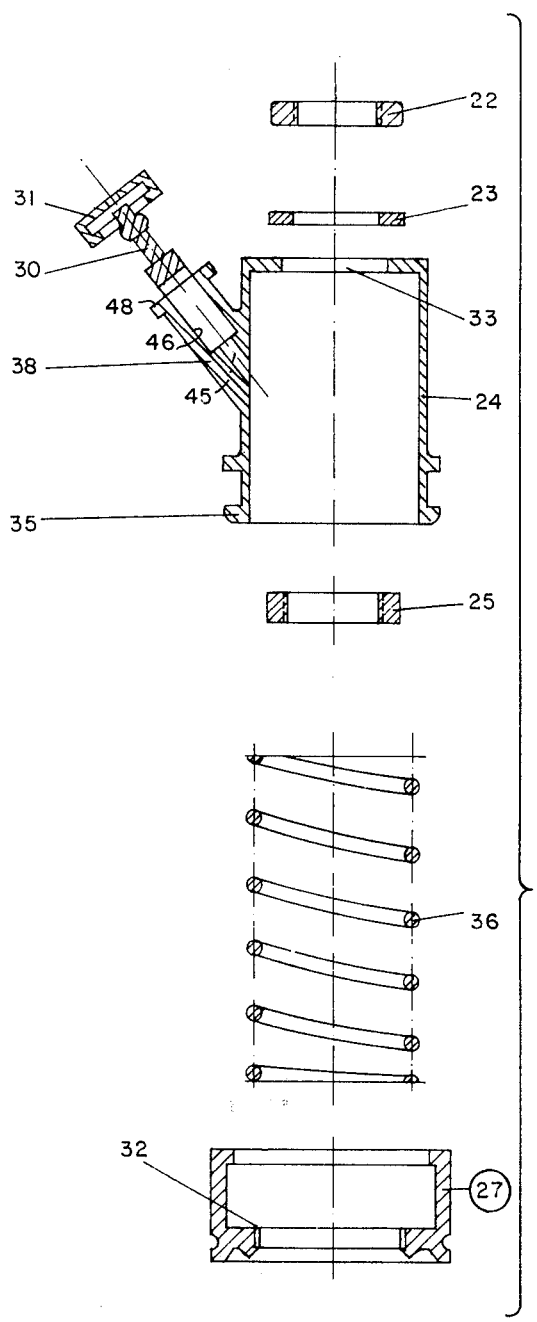
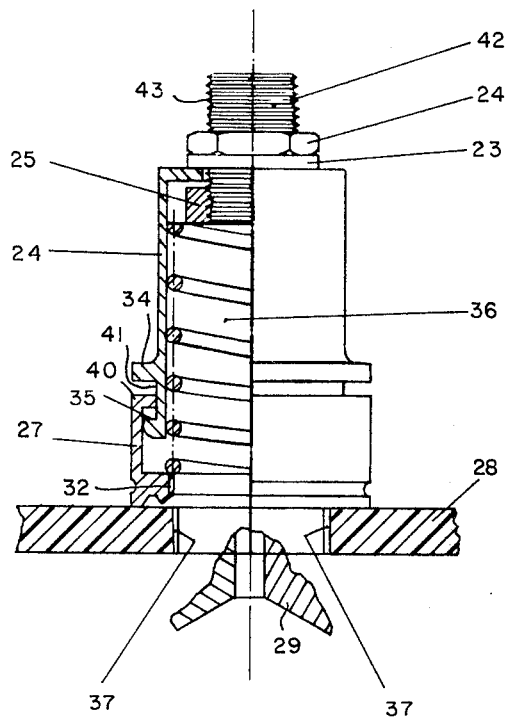
FIG. 3
FIG. 4

FIG. 8β

TIRE FAILURE INDICATOR

BACKGROUND OF THE INVENTION

This invention relates to tire failure indicators. This present invention is concerned with a device for protecting tires and inner tubes against air-leakage after failure, and failure indication by optical, acoustic, electronic or electro-thermo-mechanical means. Pneumatic vehicle tires may be of the tube or tubeless type. Furthermore, by definition, a pneumatic tire includes an air-chamber or inner tube. Both kinds of tires are air-inflated and therefore any air-chamber or inner tube rupture results in air leakage and thus deflation with the possibility of a road accident. It is, therefore, a problem in the tire art to prevent the sudden loss of air in the event of tire failure.

Many attempts have been made to prevent the sudden leakage of air through the tire chamber in the event of a failure resulting, for example, from a puncture by a foreign object. Prior art methods of preventing air loss include the use of self-sealing materials, automatic re-inflation devices and obstructives such as pulverized material inside the air-chamber or inner tube which obstructs the puncture. Such prior art methods, while expensive, have not been satisfactory in providing protection against sudden pressure loss within the tire. Further, many tubeless tires have been used called "ruptureless" in that the tire wheel rim and valve are fitted in an air tight relation. However, tubeless tires are also subject to pressure loss resulting from distortion in the region of the fitting due to high speed impacts. In addition, tubeless tires do not provide comfortable road characteristics compared with the tube type tires.

SUMMARY OF THE INVENTION

To eliminate those disadvantages and to partly solve the road accident problems, it is the object of the invention to provide firstly an apparatus for preventing sudden air leakage between the tube and tire by trapping it outside the tire, and secondly for indicating that tire failure has taken place.

Another object of the invention is to provide an apparatus concerned with the prevention of sudden air leakage in the event of tube failure by trapping air inside the tire, and indicating such failure by optical, acoustic, electronic or combined electrical and thermomechanical means.

In the event of a failure of an inner tube, air does not escape the tire through the damaged hole regardless of whether the hole is closed or open or whether the foreign object is still embedded. Rather, air enters into the interfacing surfaces between the tire and tube, passes into the wheel rim space and escapes through the valve opening in the wheel rim resulting in a sudden pressure loss.

A further object of the invention is to prevent the escape of air through the opening in the wheel rim through the inflation valve passes and for trapping the air within the rim. Towards that purpose, the invention provides means which define an air tight tube outside the wheel rim and around the valve opening and which includes means for indicating tire damage by optical, acoustic, electronic, electro-thermo-mechanical, or any other means.

In addition, the invention contemplates an assembly which may readily be fitted on the rim's valve opening for both preventing air leakage and trapping it in an air tight chamber outside the tire and which has the same pressure as that of the tube, and which pressure may be employed to actuate a tire failure indicator. This assembly includes an air chamber sealing means between the chamber, the valve and the rim valve opening and means to use the chamber's pressure for indicating tube failure or damage.

BRIEF DESCRIPTION OF THE DRAWINGS

FIG. 3 is a vertical sectional view of an alternate embodiment of the invention;

FIG. 4 is an exploded sectional view of the embodiment illustrated in FIG. 3;

FIGS. 8a, 8b and 8c show a further alternate embodiment of the invention.

PREFERRED EMBODIMENTS OF THE INVENTION

Figure 1:
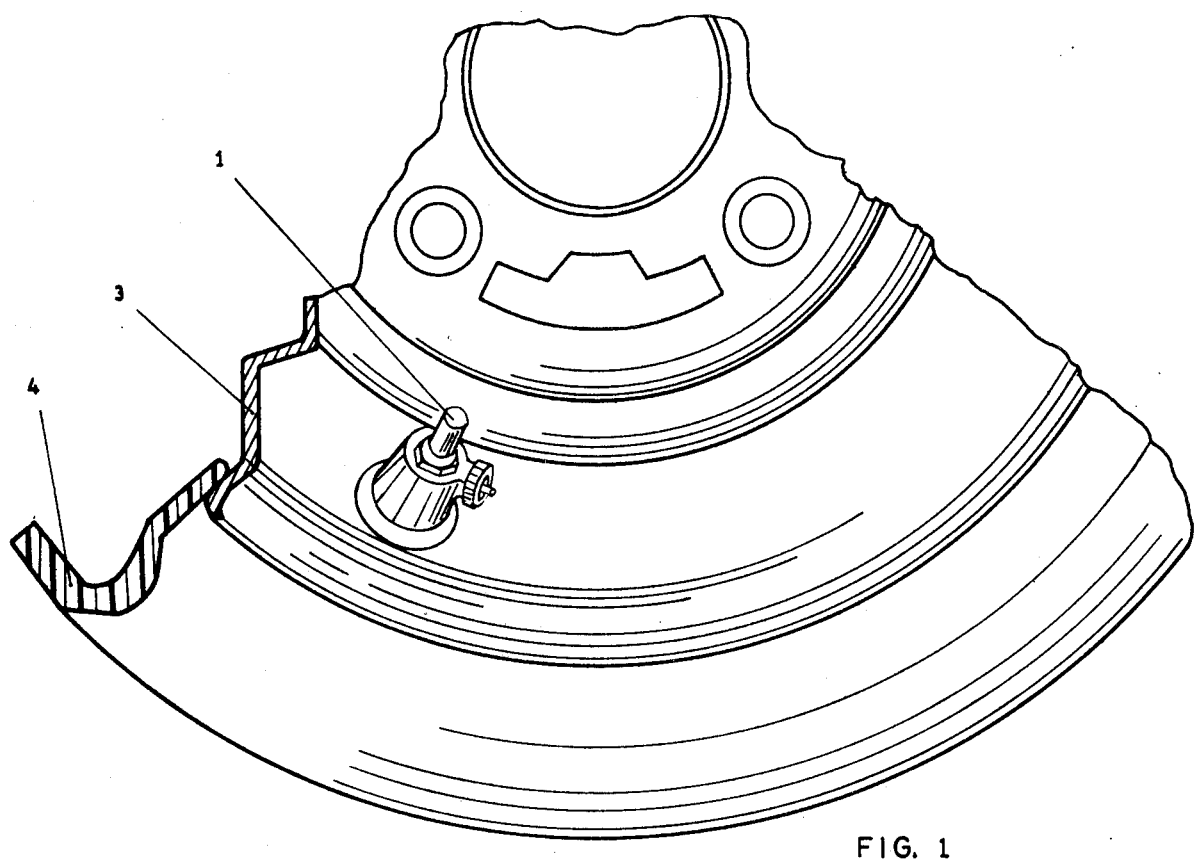
FIG. 1 is a perspective view, with parts broken away, showing one embodiment of the invention.
Figure 2:
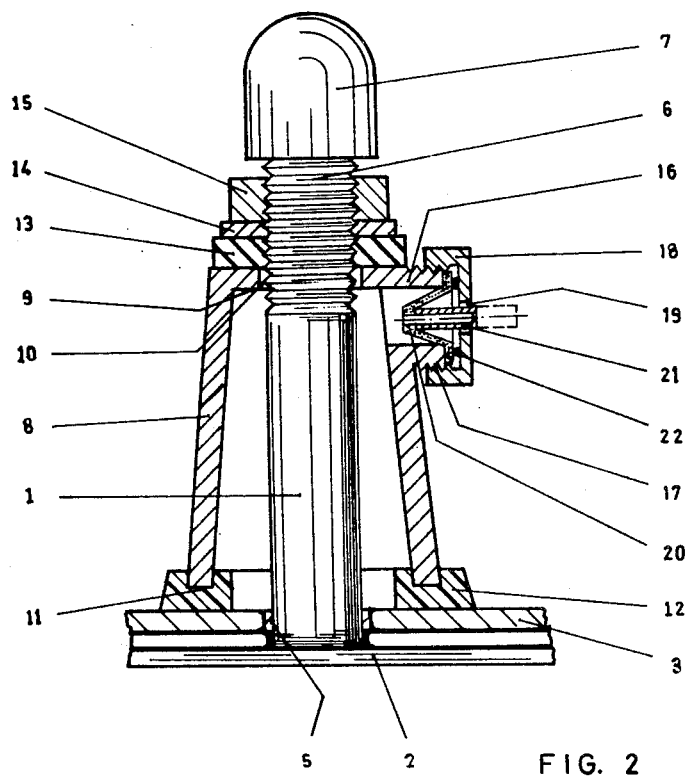
FIG. 2 is a vertical sectional view of the embodiment shown in FIG. 1.

The embodiment of the invention shown in FIGS. 1 and 2 cooperates with an inflation valve 1 of an inner tube or tire 2, which is disposed between a wheel rim 3 and a pneumatic tire 4. The valve 1 extends out of the rim 3 through an opening 5 and is threaded at its upper end for receiving an internally threaded protective cap 7. An elastic or metallic conical cover 8 is disposed in surrounding relation to the valve 1 and includes an inwardly extending wall 9 having a hole 10 whose diameter is larger than that of the valve 1. The other end of the cover 8 is open, and is received in a circular recess 11 formed in a plastic ring 12 engaging rim 3. The length of the cover 8 is such that the hole 10 is at the same level as the threads 6 of the valve 1. A ring 13 of an elastic material is supported on the upper wall 9 of the cover 8, and a metallic washer 14 is disposed on the ring 13 and both are secured by a nut 15 that cooperates with the threads 6 of the valve 1. As the nut 15 is fastened, it presses the ring 12 against the rim 3, through the agency of the cover 8 to insure tightness between the cover 8 and the rim 3 around the hole 5 through which the valve 1 protrudes. The pressure between the ring 13 and the washer 14 against the top wall 9 resulting from the engagement between the nut 15 and the threads 6 insures an air tightness between the cover 8 and the valve 1.

The cover 8 has a hollow cylindrical projection 16 extending radially from the cover 8. Threads 17 are formed at the free end of projection 16 for receiving an internally threaded cover 18 having a central opening 19. An elastic membrane 20 has a centrally affixed needle 21 opposite the hole 19 and is fastened between the end of projection 16 and a washer 22 held in place by the cover 18.

When the tire 4 fails, the air escaping the air tube 2 passes into the cover 8 and the projection 16 and as the pressure is applied to the membrane 20, it is forced outwardly so that the needle 21 is projected through the hole 19 indicating that failure of the tire 4 has occurred.

Reference is now made to FIGS. 3 and 4 which show an alternate embodiment of the invention to include a hollow, annular member 27 disposed about the opening 37 in rim 38 and having inwardly directed flanges 32 and 40 at its lower and upper ends respectively. A hollow, generally tubular housing 24 is arranged coaxially with member 27 and includes a pair of outwardly directed, spaced apart flanges 34 and 35 adjacent its lower end. The outer cylindrical surface portion 41 of housing 24 located between flanges 34 and 35 is slidably engaged by the inner periphery of flange 40.

The valve 42 passes upwardly through openings 37 in rim 28 and 33 in housing 24 and has threads 43 adjacent its upper end. An elastic nut 25 threadably engages threads 43 below the upper end of housing 24. Also disposed within housing 24 and in surrounding relation to valve 42 is a return spring 26 whose upper end engages nut 25 and whose lower end bears against flange 32. A resilient washer 23 is disposed between the upper end of housing 24 and a nut 44 threadably received on the upper end of valve 42.

Extending outwardly and upwardly from the housing 24 is a cylindrical indicator housing 38 which is coupled by a passage 45 to the interior of housing 24 and has a cylindrical bore for slidably receiving the piston 47 of an indicator 30. A safety stopper or cap 31 fits over a flange 48 on the end of indicator housing 38.

When the structure illustrated in FIGS. 3 and 4 is assembled, the nut 44 is turned down forcing the housing 24 to move downwardly until it is clamped between the two resilient members 23 and 25. This provides an air tight joint between the housing 24 and the valve 42 and between the inner tube 29 and the opening 37 in the rim 28. This provides a sealed air chamber 36 within housing 24.

Air enters the chamber 36 defined by housing 24 as a result of the motion of valve 42 which moves in a generally circular path and in addition, reciprocates axially as a result of the flattening of the tire against the roadway. This causes a gap to occur between the valve 41 and the periphery 37 of the rim opening so that air pressure increases within chamber 36 such that the piston 47 will be forced outwardly as an indication of tire failure.

Figure 5:
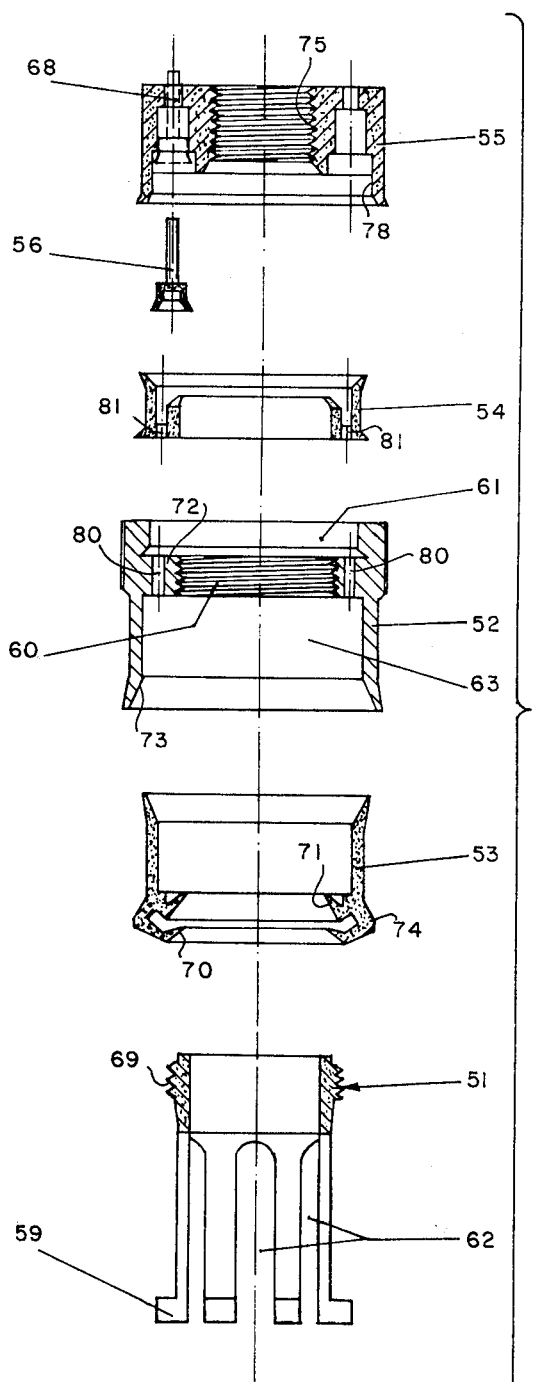
FIG. 5 is an exploded perspective sectional view of another alternate embodiment of the invention.
Figure 6:
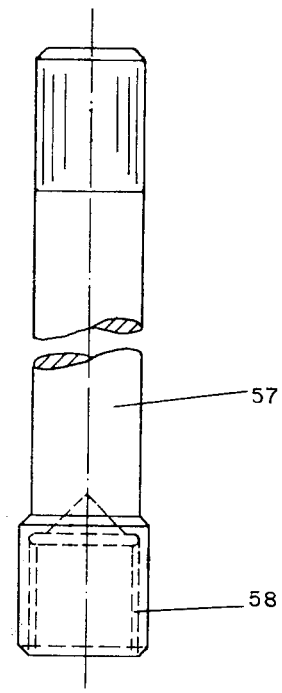
FIG. 6 shows a device for installing the device of FIG. 5.
Figure 7:
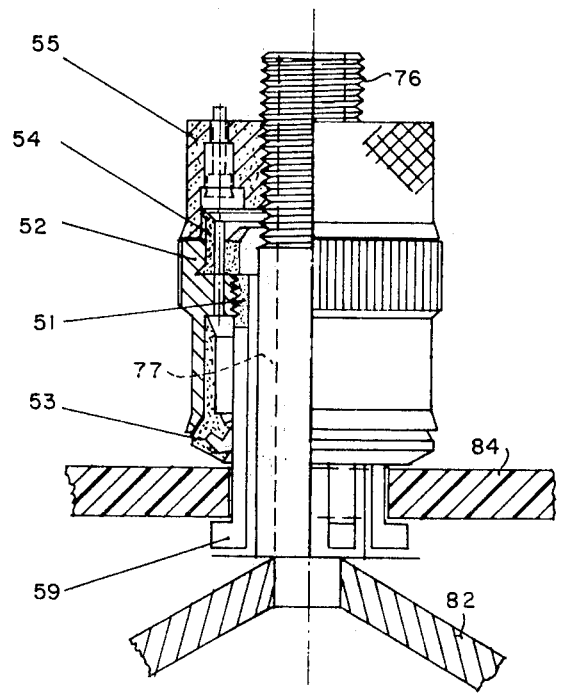
FIG. 7 is a side view, partially in section of the embodiment of FIG. 5.

Another embodiment of the invention is shown in FIGS. 5, 6 and 7 to include a tubular body member 51 of a plastic material and disposed in surrounding relation to valve 77. Member 51 has a plurality of slots 62 extending logitudinally from its lower end and terminating adjacent a threaded upper end 69. In addition, a plurality of outwardly projecting feet 59 are formed at the lower end of member 51. Surrounding the member 51 and intermediate its ends is a generally tubular member 53 formed of an elastic material and having inwardly projecting and axially spaced apart annular lips 70 and 71 which engage the outer periphery of member 51. A second tubular member 52 is disposed in surrounding relation to member 53 and has an inwardly projecting collar 72 which has internal threads 60 which are threaded on the upper end 69 of member 51. Member 52 has a generally frusto-conical internal surface 73 which sealingly engages a complementary surface 74 adjacent the lips 70 and 71 whereby member 53 effects a seal between members 51 and 52. An annular member 54 of an elastic material is disposed in a recess 61 formed in the upper end of member 52. A generally tubular member 55 of plastic or other suitable material has internal threads 75 which are threaded over the external threads 76 on the upper end of the valve 77. The member 55 has a circular recess 78 formed adjacent its lower end for receiving the upper end of member 54 which thereby provides a resilient seal between the members 52 and 55. Extending axially through member 55 is a pair of counter sunk bores 68 for receiving one of a pair of indicator members 56, only one of which is shown in FIG. 5. Each indicator member 56 has a stem portion 78 which extends upwardly through the small diameter portion of passage 68 and a cup-shaped plunger 79 adjacent its lower end. Communication between the interior 63 of member 52 and the plungers 79 is provided by axially extending passages 80 in collar 72 of member 52 and 81 in member 54.

In order to attach the assembly of FIGS. 5 and 7 to the valve 77, air pressure in the tube 82 is first decreased and member 57 is then attached to valve 77 by screwing threads 58 onto threads 76. Member 57 is then pressed downward to depress valve 77 and separate its base from the rim 84. This permits the feet 59 on member 51 to be inserted into the hole 85 in rim 84 and between the rim 84 and the tube 82. The member 7 is then removed and air pressure within tube 82 increased to normal levels. The member 53 is then placed over member 51 and the member 52 is then placed around member 53 and its threaded portion 60 is screwed onto threads 69 on the upper end of member 51 until the upper surface of collar 72 is about even with the upper surface of member 51. Member 54 is then set into position within recess 61 and threads 75 of member 55 are turned onto threads 76 of valve 77.

Operation of the device illustrated in FIGS. 5, 6 and 7 is similar to that discussed with respect to the embodiments of FIGS. 1–4. Air escaping the tube 82 passes out of the opening 85 upwardly into member 51, out slots 62 and into chamber 63 whose pressure attains that of the tire air chamber. This pressure applied beneath the cups 79 forces the indicators 56 upwardly. Cups 79 prevent the escape of air from chamber 63.

Figures 8, 8A:
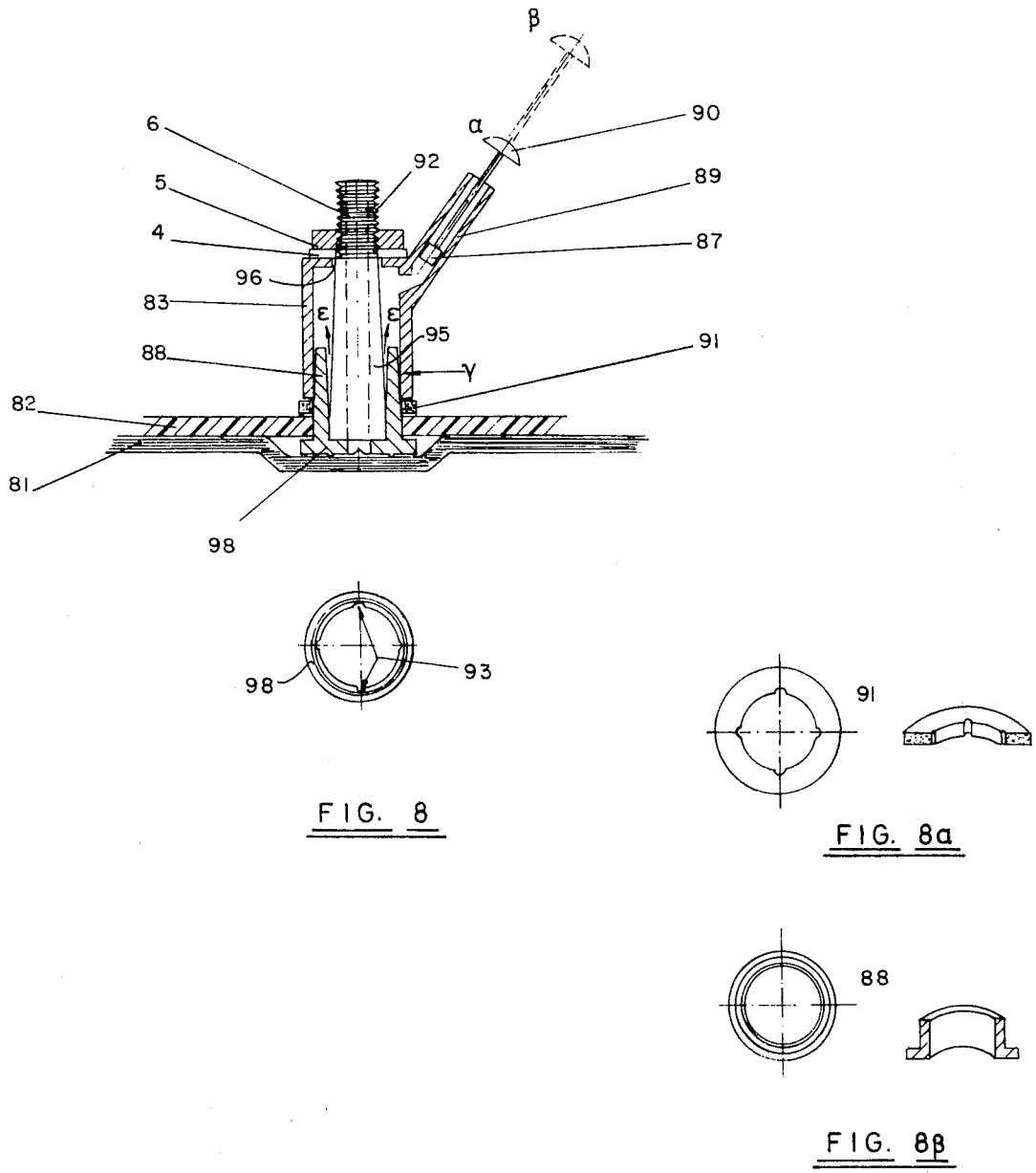

Still another embodiment of the invention is shown in FIGS. 8, 8a and 8b wherein 81 is the air chamber wall and 82 is the rim. A sleeve 88 of any suitable material, such as plastic, extends through the opening 94 in rim 82 in surrounding relation to the valve 95. The base 98 of sleeve 88 is disposed within rim 82. A hollow, generally cylindrical housing 83 surrounds sleeve 88 and has an opening 96 through which the valve 95 extends. The housing 83 is held in position and its interior sealed by packing rings 84 and 95 respectively engaging the upper and lower surfaces of said housing and a nut 85 which is threaded onto the upper end 92 of valve 95. The failure indicator includes a hollow arm 89 in which a piston 87 is slidably mounted. A stem 97 extends outwardly of the arm 89 and carries a colored indicator 90 at its outer end. A plurality of slots 93 are formed at the lower inner surface of housing 83 to insure the flow of air between member 83 and valve 95.

Normally piston 87 is in its position shown by full lines in FIG. 8. In the event of a failure, air under pressure will pass through slots 13 and into chamber e causing the piston 87 to move outwardly of arm 89 whereby indicator 90 moves from its position a to its position b shown by broken lines.

As an alternative to the optical indicator of FIG. 8, a buzzer (not shown) may be disposed in arm 89 and is preferably of the interrupter type which is actuated by a specific quantity of air and then stops so that there will not be an appreciable pressure drop in chamber e.

An alternate application of the invention is to couple the illustrated optical indicators for actuating a conventional electrical indicator on the vehicle's dashboard.

It will be appreciated that the above described embodiments of the invention are discussed solely with respect to tube-type applications because in tubeless applications, the valve is held tightly to the wheel rim by internal air pressure. However, the present invention may be applied to tubeless tire applications by providing a modified valve similar to those discussed above and which includes a graduated scale for indicating a pressure loss.

While only a few embodiments of the invention have been illustrated and described, it is not intended to be limited thereby, but only by the scope of the appended claims.

We claim:

1. A tire failure indicator for use in a wheel rim opening, a tire valve extending through the opening, said indicator including a housing means constructed and arranged to be disposed about said opening in surrounding relation to the tire valve, first sealing means for sealing said housing means to the valve and second sealing means for sealing said housing means to the rim in surrounding relation to the opening, the height of said housing means above the rim being less than that of the valve so that the valve extends outwardly of the housing means, and pressure responsive means coupled to said housing means for indicating a pressure rise therein resulting from leakage of air from said rim and through said opening.

2. The indicator set forth in claim 1 wherein said housing means has a pair of generally parallel bases, an opening formed in each base and arranged generally coaxially, the valve passing through said openings, the areas of said openings being greater than the cross-sectional area of the valve at the point of passage through said openings, said first and second sealing means respectively comprising first and second sealing members engaging said housing means at said openings.

3. The indicator set forth in claim 2 and wherein the tire valve is threaded at its outer end, and threaded means engaging said threaded end of said valve for holding one of said sealing members in engagement with said housing means.

4. The indicator set forth in claim 1 and wherein the housing means includes a first member having a base portion disposed in the wheel rim and about the opening therein and a tubular portion extending outwardly of the opening, said housing means also including a second tubular member engaging the tubular portion, said first and second sealing means respectively comprising a first seal member for sealing between said first and second members and a second seal member for sealing the second member to the valve.

5. The indicator set forth in claim 1 wherein said pressure responsive means includes a second housing means coupled to said first housing means for receiving compressed air therefrom, a pressure responsive member in said second housing means and responsive to excess pressure therein for being moved in an outward direction relative to said second housing means, and indicator means coupled to said pressure responsive member and constructed and arranged to be actuated by movement thereof.

6. The indicator set forth in claim 1 wherein said housing means has a pair of openings in spaced apart relation, said valve passing through said openings, said first sealing means including a first seal member engaging said housing means in surrounding relation to one of said pair of openings and also engaging said wheel rim in surrounding relation to the wheel rim opening, said second sealing means also including a second seal member engaging said housing means in surrounding relation to the other of said pair of openings.

7. The indicator set forth in claim 1 wherein said housing means includes a pair of generally tubular housing members arranged generally coaxially, one of said housing members engaging said wheel rim at said opening and surrounding said valve as it passes through said opening, the other of said housing members having an opening through which said valve passes, said first and second sealing means respectively including a first sealing member disposed adjacent the opening in said other housing member to seal the passage of said valve therethrough and a second sealing member disposed between said housing members.

8. The indicator set forth in claim 7 wherein said pressure responsive means includes a third housing portion coupled to one of said housing members for receiving compressed air therefrom, a pressure responsive member in said second housing means and responsive to excess pressure therein for being moved in an outward direction relative to said second housing means, and indicating means coupled to said pressure responsive member and constructed and arranged to be actuated by movement thereof.

9. The indicator set forth in claim 8 and wherein the tire valve is threaded at its outer end, and threaded means engaging said threaded end of said valve for holding said second sealing member in engagement with said housing members.

10. The indicator set forth in claim 9 and wherein one of said tubular housing members includes a base portion disposed in the wheel rim and about the opening therein and a tubular portion extending outwardly of the wheel rim opening, said second tubular housing member engaging the tubular portion.

* * * * *